US010471826B2

(12) United States Patent
Hamilton et al.

(10) Patent No.: US 10,471,826 B2
(45) Date of Patent: Nov. 12, 2019

(54) TRANSFER CASE HAVING A FOUR WHEEL DRIVE LOCKING MECHANISM

(71) Applicant: BorgWarner Inc., Auburn Hills, MI (US)

(72) Inventors: Ray Fortune Hamilton, Novi, MI (US); Jeffrey Richard Edwards, Leonard, MI (US)

(73) Assignee: BorgWarner Inc., Auburn Hills, MI (US)

( * ) Notice: Subject to any disclaimer, the term of this patent is extended or adjusted under 35 U.S.C. 154(b) by 370 days.

(21) Appl. No.: 15/368,836

(22) Filed: Dec. 5, 2016

(65) Prior Publication Data

US 2017/0158052 A1    Jun. 8, 2017

Related U.S. Application Data

(60) Provisional application No. 62/264,728, filed on Dec. 8, 2015.

(51) Int. Cl.
*B60K 17/344* (2006.01)
*B60K 17/346* (2006.01)
*F16H 63/30* (2006.01)
*B60K 23/08* (2006.01)

(52) U.S. Cl.
CPC ............ *B60K 17/344* (2013.01); *B60K 23/08* (2013.01); *B60K 23/0808* (2013.01); *F16H 63/304* (2013.01); *B60K 2023/085* (2013.01); *B60Y 2400/424* (2013.01); *B60Y 2400/82* (2013.01); *F16H 2063/3056* (2013.01)

(58) Field of Classification Search
CPC .. B60K 17/344; B60K 17/3467; F16H 63/304
USPC ............................................. 74/665 G
See application file for complete search history.

(56) References Cited

U.S. PATENT DOCUMENTS

| | | | | |
|---|---|---|---|---|
| 6,022,289 A | * | 2/2000 | Francis ............. | B60K 17/3467 475/204 |
| 8,622,164 B2 | * | 1/2014 | Takaira ................. | B60K 23/08 180/233 |
| 9,186,987 B2 | | 11/2015 | Mastie et al. | |
| 9,447,873 B2 | | 9/2016 | Pritchard | |
| 2003/0224894 A1 | * | 12/2003 | Vonnegut ........... | B60K 17/3505 475/204 |

(Continued)

*Primary Examiner* — Ha Dinh Ho
(74) *Attorney, Agent, or Firm* — Young Basile Hanlon & MacFarlane, P.C.

(57) ABSTRACT

A transfer case includes a housing, along with an input shaft, a primary output shaft, a secondary output shaft, and a secondary torque transfer mechanism, each disposed at least partially within the housing. The input shaft is configured to couple to the primary output shaft to transfer torque thereto. The secondary torque transfer mechanism includes a rotating member coupled to the secondary output shaft and a locking mechanism. The locking mechanism includes a locking ring, a fork member engaging the locking ring, and a slide shaft coupled to the fork member and configured to slide the locking ring to positively couple the primary output shaft to the rotating member to transfer torque to the secondary output shaft. The housing includes an aperture axially configured to receive an elongated tool configured to be rotated manually external to the housing for engaging and moving the slide shaft to the second position.

19 Claims, 6 Drawing Sheets

(56) References Cited

U.S. PATENT DOCUMENTS

2005/0101429 A1* 5/2005 Allen ................. B60K 17/3467
  475/223
2013/0263684 A1* 10/2013 McCloy ............... B60K 17/344
  74/473.36

* cited by examiner ated according to an exemplary embodiment, and FIG. 6 is a cross-sectional view of a transfer case accord-

TRANSFER CASE HAVING A FOUR WHEEL DRIVE LOCKING MECHANISM

CROSS-REFERENCE TO RELATED APPLICATIONS

This application claims priority to and the benefit of U.S. Provisional Application No. 62/264,728, filed Dec. 8, 2015, which is incorporated herein by reference in its entirety.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a plate clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

It would be advantageous to provide a transfer case that additionally includes a locking mechanism for positively coupling the primary output shaft and the secondary output shaft for transferring torque therebetween. It would be further advantageous to provide a transfer case with a common actuator system, which selectively operates the plate clutch and the locking mechanism, and further causes the transfer case to selectively change between high and low range.

SUMMARY

A transfer case includes an input shaft, a primary output shaft, a secondary output shaft, a gear reduction mechanism, a secondary torque transfer mechanism, and an actuator system. The gear reduction mechanism is configured to transfer torque from the primary output shaft to the secondary output shaft in a first drive ratio and a second drive ratio. The secondary torque transfer mechanism includes a plate clutch and a locking ring, which are each configured to transfer torque from the primary output shaft to the secondary output shaft. The actuator system includes a drive assembly, and is configured to cause the gear reduction mechanism to change between the first drive ratio and the second drive ratio by rotating the drive assembly in a first stage of rotation. The actuator system is further configured to cause the plate clutch to transfer torque from the primary output shaft to the secondary output shaft by rotating the drive assembly in a second stage of rotation in a first direction after a first end of the first stage of rotation. The actuator system is also configured to cause the locking ring to transfer torque from the primary output shaft to the secondary output shaft by rotating the drive assembly in a third stage of rotation in a second direction, opposite the first direction, after a second end of the first stage of rotation.

The locking mechanism may include a slide shaft operationally coupled to a cam follower and the locking ring. The cam follower engages a movement advance region of the drive assembly during the third stage of rotation to move the slide shaft to move the locking ring to transfer torque between the primary output shaft and the secondary output shaft.

BRIEF DESCRIPTION OF THE DRAWINGS

The description herein makes reference to the accompanying drawings, wherein like referenced numerals refer to like parts throughout several views, and wherein.

DETAILED DESCRIPTION

Figure 1:
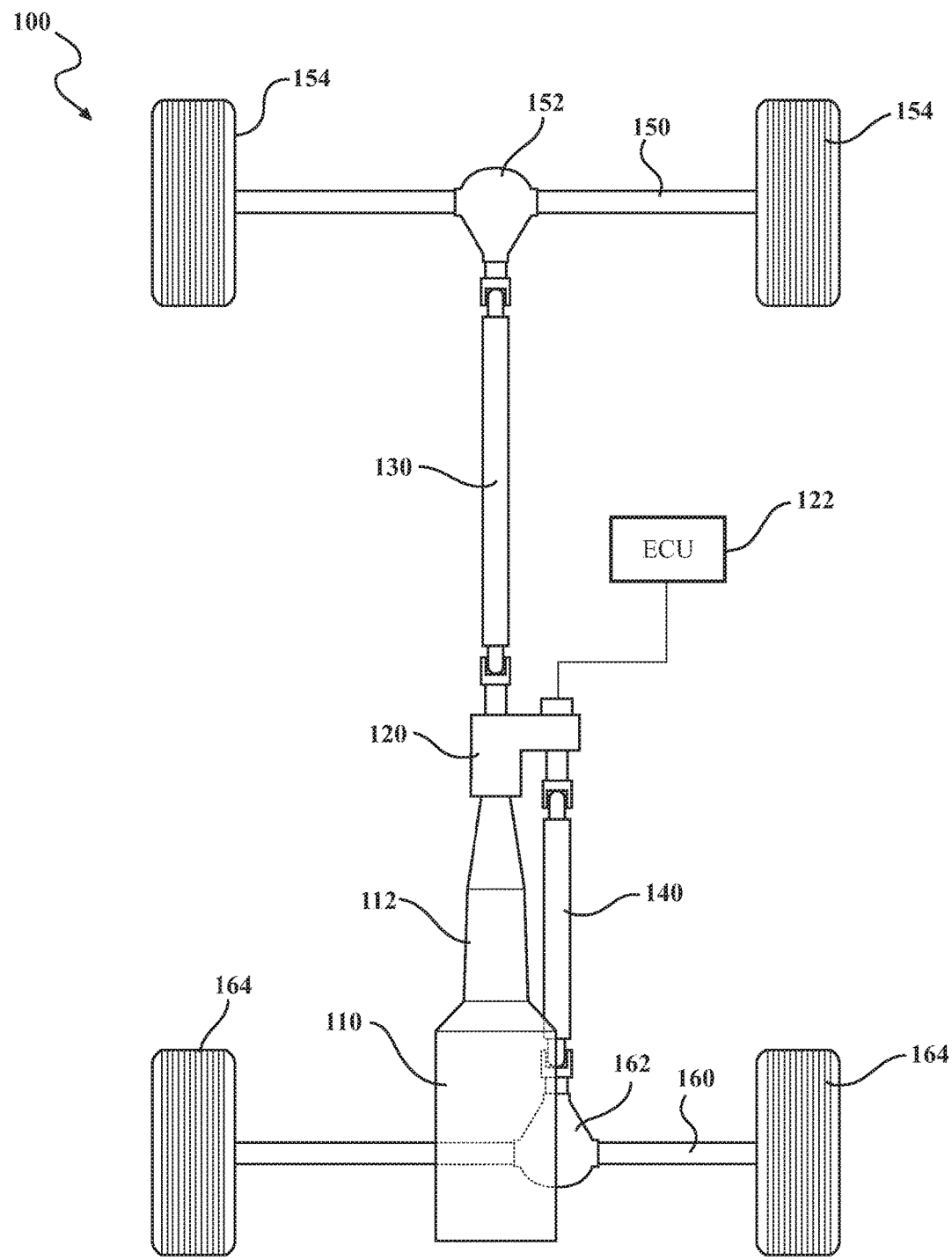
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft and the front driveshaft 140 is the secondary driveshaft. In other implementations, the front driveshaft 140 is the primary driveshaft and the rear driveshaft 130 is the secondary driveshaft, and the transfer case 120 performs a mode shift between a front-wheel drive mode and a four-wheel drive mode. In other implementations, the transfer case 120 does not include components that allow a mode shift, and the transfer case 120 constantly provides driving power to both of the rear driveshaft 130 and the front driveshaft 140.

The transfer case 120 can allow a range shift that selectively provides gear reduction to the rotational output of the transfer case 120. For example, the transfer case can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
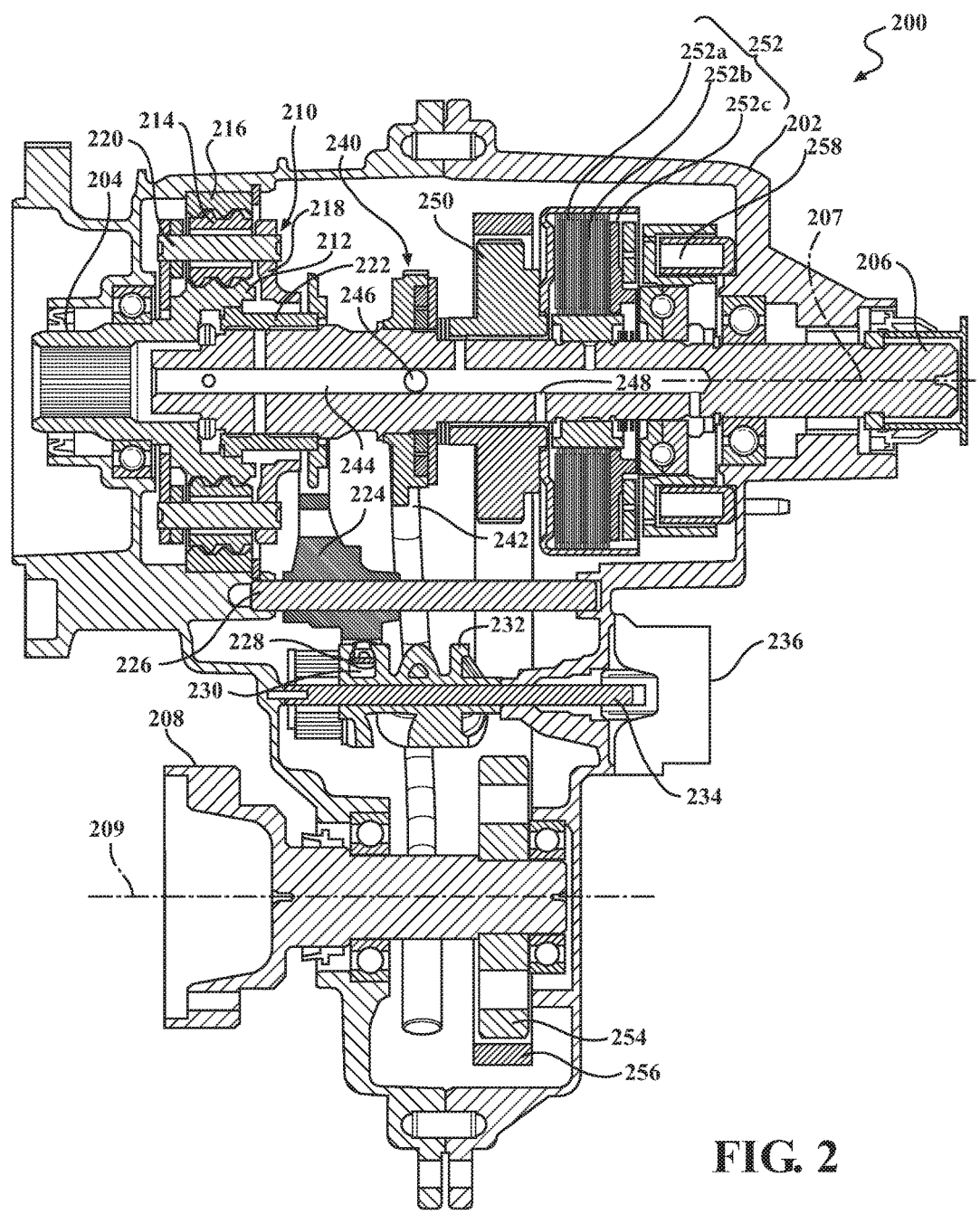
FIG. 2 is a cross-section illustration showing a transfer case having a conventional actuation system.

As shown in FIG. 2, the transfer case 200 generally includes a gear reduction system or mechanism 210 and a secondary torque transfer system or mechanism. The gear reduction system 210 is configured to transfer torque selectively at different drive ratios from an input shaft 204 to a primary output shaft 206, and is operable by a reduction actuation mechanism. The secondary torque transfer system is configured to selectively transfer torque between the primary output shaft 206 (e.g., the rear output shaft) and a secondary output shaft 208 (e.g., the front output shaft), and is operable by a torque transfer actuation mechanism. In the discussion that follows, directional terminology (e.g., front, forward, back, rearward, etc.), though referring to an orientation in which the transfer case might may be installed in a vehicle (e.g., in the cross-sections shown in FIGS. 2 and 3, the left side is the front of the transfer case, while the right side is the rear of the transfer case), such directional terminology is for reference only, as other mounting orientations of the transfer cases are possible.

The transfer case 200 includes a housing 202 and rotating components including an input shaft 204, a primary output shaft 206, and a secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position of the gear reduction hub 222, the gear reduction hub 222 is positioned forward axially (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated be an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. The second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged.

The plate clutch 252 generally includes a housing or drum 252a, a plurality of interleaved plates 252b, a pressure or apply plate 252c, and an actuator 258. The housing 252a generally includes a radial base through which the primary output shaft 206 extends, and a concentric or annular flange extending axially away from an outer periphery of the base to form a generally cylindrical housing in which the interleaved plates 252b are positioned. The base of the housing 252a is coupled to the first sprocket 250 to cause rotation thereof, while the apply plate 252c is coupled to the primary output shaft 206 (e.g., through a splined connection) to rotate therewith. The interleaved plates 252b alternate between being engaged (e.g., splined) with the primary output shaft 206 and an inner periphery of the housing 252a. The actuator 258 is configured to press on the apply plate 252c, so as to compress the interleaved plates 252b between the apply plate 252c and the base of the housing 252a, so as to increase friction therebetween and transfer torque between the plates 252b splined with primary output shaft 206 and the plates 252b splined with the housing 252a. In this manner, torque may be selectively transferred from the primary output shaft 206 to the first sprocket 250 and ultimately the secondary output shaft 208.

Figure 3:
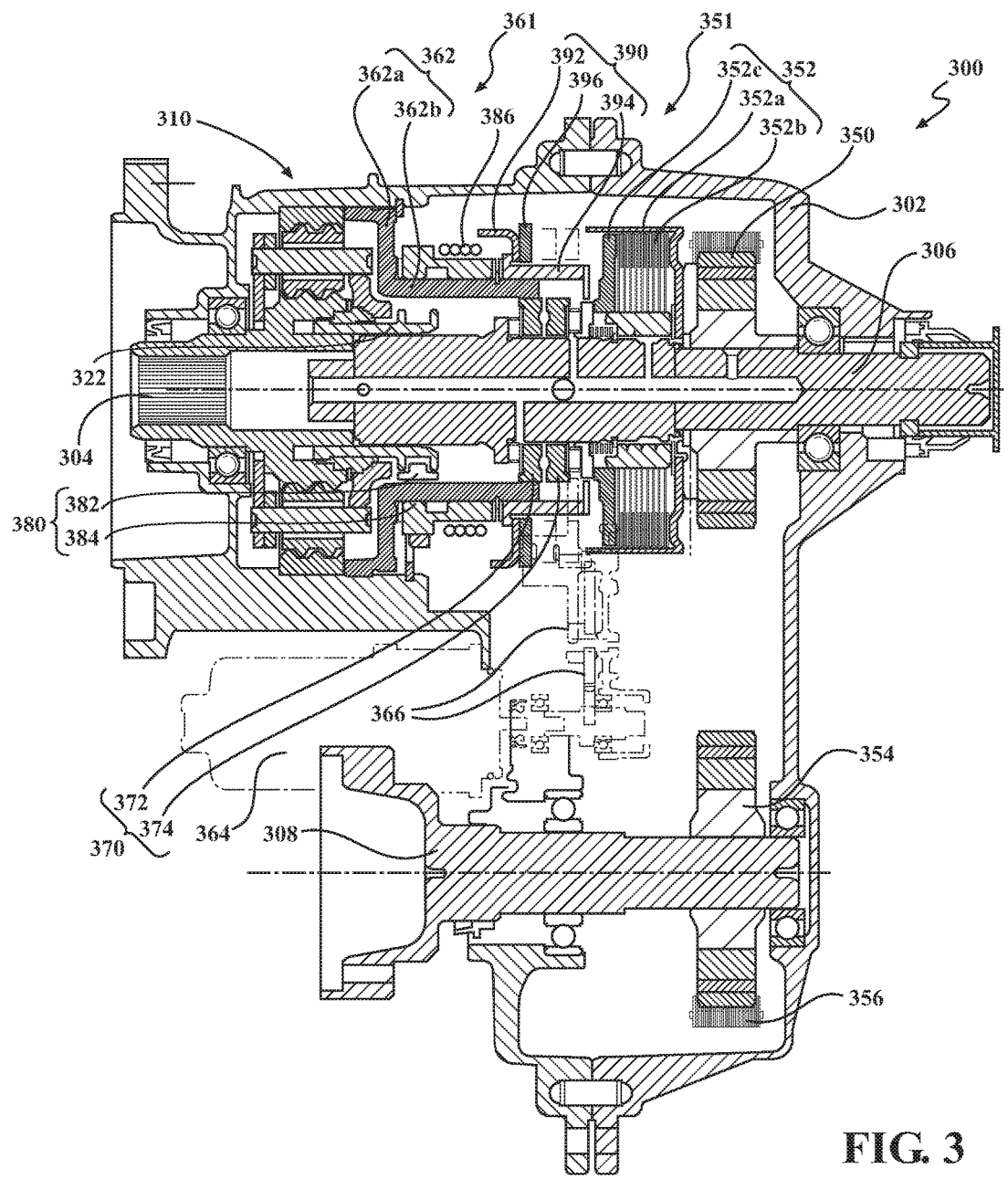
FIG. 3 is a cross-section illustration showing a transfer case having an actuation system according to an exemplary embodiment.
Figure 4:
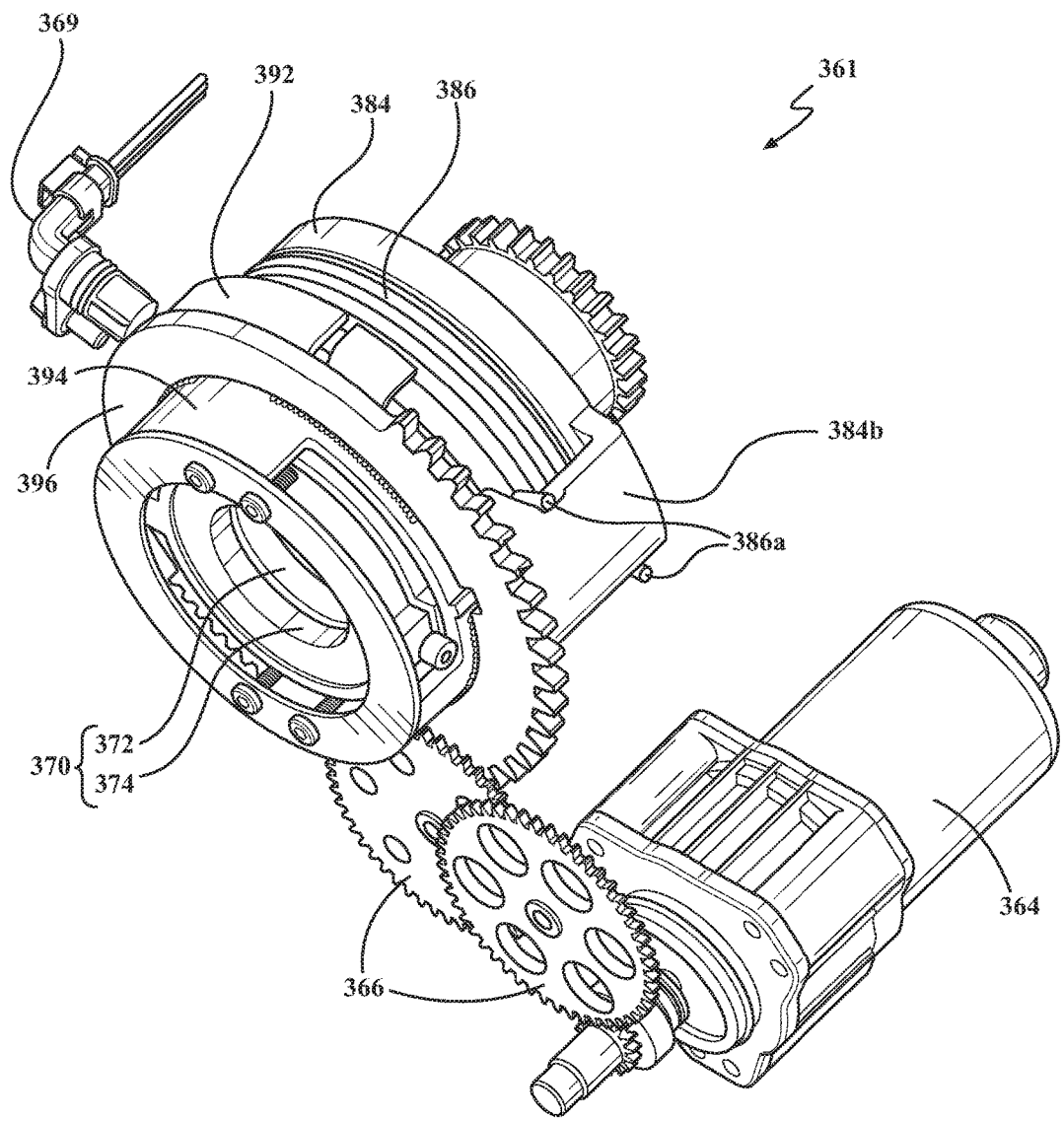
FIG. 4 is a rear perspective view of the actuation system.
Figure 5:
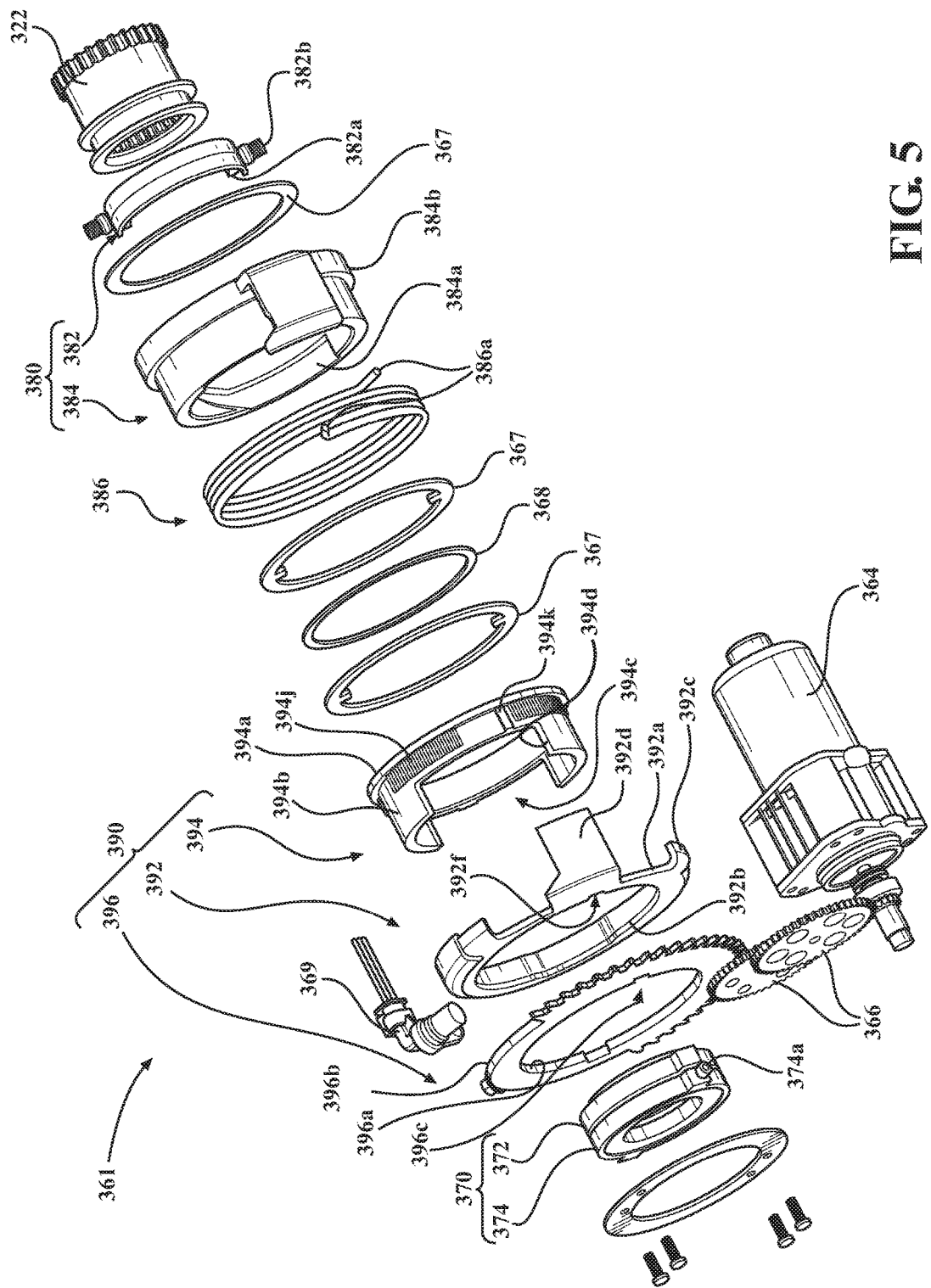
FIG. 5 is an exploded view of the actuation system.

FIG. 3 is a cross-sectional illustration showing the transfer case 300, while FIGS. 4-5 depict an actuation system 361 of the transfer case 300 in isolation. The transfer case 300 generally includes a gear reduction mechanism 310 and a secondary torque transfer mechanism 351, which include similar components (not shown in the cross-sectional view of FIG. 3) and functionality of the gear reduction mechanism 210 and secondary torque transfer mechanism discussed previously, along with an actuation system or mechanism 361 that functions to operate both the gear reduction mechanism 310 and the secondary torque transfer mechanism 351. Components and assemblies of the transfer case 300 having generally the same and/or similar function as those of the transfer case 200 are generally described with common naming and numbering increasing by 100 (e.g., gear reduction mechanism 210 and gear reduction mechanism 310) across different embodiments.

As compared to the transfer case 200, the orientation of a plate clutch 352 and sprocket 350 of the secondary torque transfer mechanism 351 is reversed front to rear with the plate clutch 352 having its apply plate 352c facing forward, and the plate clutch 352 itself being disposed forward of the sprocket 350. The actuation system 361 is generally positioned axially between the gear reduction mechanism 310 and the plate clutch 352. The actuation system 361 engages a reduction hub 322 to operate the gear reduction mechanism 310 and is further configured to engage the apply plate 352c of the plate clutch 352 to operate the secondary torque transfer mechanism 351.

As shown in FIGS. 3-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. For example, a first stage is associated with the gear reduction actuator mechanism 380. In the first stage (e.g., first or initial range of motion or rotation; first positive stage and first negative stage), the drive gear assembly 390 is rotated (e.g., +/− between 30 and 50 degrees from center, such as 35 degrees) by the motor 364 via the reduction gears 366 to operate the gear reduction actuator mechanism 380, which moves the gear reduction hub or coupling 322 into the first position (e.g., high range at +35 degrees) or the second position (e.g., low range at −35 degrees). In a second stage (e.g., second, continued, or subsequent range of motion or rotation from ends of the first stage; second positive stage, and second negative stage), the drive gear assembly 390 is further rotated (e.g., +/−an additional 10-30 degrees, such as 25 degrees, meaning +35 degrees to +60 degrees and −35 degrees to −60 degrees) by the motor 364 to operate the secondary torque transfer actuator mechanism 370, which presses the clutch apply plate 352c to compress the interleaved plates 352b within the clutch housing 352a. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provided for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

The actuator base 362 is a generally rigid, stationary member that fixedly couples the actuation system or actuator 361 to the housing 302 of the transfer case 300. The actuator base 362 generally includes a base portion 362a (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362b (e.g., a radially inner or annular portion or stem), which extends rearward axially away from the base portion 362a toward the plate clutch 352. The actuator base 362 includes a central bore (not labeled) through which the primary output shaft 306 extends. Other components of the actuation system 361 are fixedly or movably coupled to the body portion 362b as discussed below.

The motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to the housing 302, and the reduction gears 366 are rotatably coupled to the housing 302, at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362b of the actuator base 362 and radially outward of the primary output shaft 306. The shift fork 382 is generally semicircular and includes an inner flange 382a that extends radially inward from an inner peripheral surface of the shift fork 382. The inner flange 382a is positioned between and engages radially outwardly extending, peripheral flanges of the gear reduction hub 322, such that axial movement of the shift fork 382 moves the gear reduction hub 322 axially between the first and second positions.

The shift fork 382 also includes two followers 382b configured as rollers, each extending radially outward from the outer peripheral surface of the shift fork 382 through an axially extending slot (not shown) in the body portion 362b of the actuator base 362 to be engaged by the barrel 384 (discussed below). The axially extending slot of the body portion 362b of the base maintains the shift fork 382 in a constant rotational position relative to the actuator base 362, while allowing the shift fork 382 to translate axially. The two followers 382b are positioned substantially opposite each other (i.e., approximately 180 degrees apart) at, or proximate to, ends of the shift fork 382. Each follower 382b is coupled to and rotates about an axle, which extends substantially radially outward from ends of the shift fork 382 (e.g., perpendicular to the outer peripheral surface). The shift fork 382 may additionally include a boss or protrusion for each follower 382b extending radially outward from the outer peripheral surface to which the axle is coupled.

The barrel 384 is a generally cylindrical member that surrounds the body portion 362b of the actuator base 362 and is configured to rotate thereabout to, thereby, axially move the shift fork 382. The barrel 384 includes an inner peripheral surface that bears against an outer peripheral surface of the body portion 362b of the actuator base 362. One or more thrust washers 367 and/or snap clips 368 are coupled to the outer periphery of the body portion 362b at an intermediate axial location thereof, as well as adjacent the base portion 362a. As the barrel 384 rotates about the body portion 362b of the base, edges of the barrel 384 may slide and bear against the thrust washers 367 to transfer an axial force for moving the gear reduction hub 322 relative to the actuator base 362 forward and rearward.

The barrel 384 includes an inner cam slot 384a configured to engage and axially move the shift fork 382 and, thereby, move the gear reduction hub 322 between the first and second positions. Each cam slot 384a extends radially outward from the inner peripheral surface with one of the followers 382b of the shift fork 382 being positioned in each slot 384a. Each cam slot 384a includes a movement region having opposed helically ramped surfaces that engage the follower 382b during the first movement stage (i.e., initial rotation of the barrel 384 and the drive gear assembly 390 from center) to move the shift fork 382 axially forward and rearward. The movement region is flanked by dwell or flat regions in which the slot 384a maintains the follower 382b in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member 384b, which is positioned radially outward of an outer peripheral surface of the barrel 384 and extends axially rearward from a forward end of the barrel 384. The outer radial member 384b is engaged by a torsion spring 386, which transfers torque from the drive gear assembly 390 to rotate the barrel 384. More particularly, the torsion spring 386 is positioned between the outer peripheral surface of the barrel 384 and the outer radial member 384b and is wound about and bears against the outer peripheral surface of the barrel 384. The torsion spring 386 includes two ends 386a that extend radially outward to engage axially-extending edges of the outer radial member 384b and to engage the drive gear assembly 390 to transfer torque therebetween. In the case of a blocked shift event (i.e., when splines of the reduction hub 322 engage ends of splines of the input shaft 304 or planet carrier of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310.

The secondary torque transfer actuator mechanism 370 functions as a face cam mechanism to convert continued rotation of the drive gear assembly 390 into axial movement for operating the plate clutch 352 within the second stage of rotational movement (e.g., continued rotation from approximate ends of the first stage). The secondary torque transfer actuator mechanism 370 includes a forward member 372 (e.g., first plate or ring) and a rearward member 374 (e.g., second plate or ring), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion 362b of the actuator base 362, while the rearward member 374 is configured to both rotate and move axially relative to the forward member 372 and, thereby, move relative to the actuator base 362. For example, as shown, the forward member 372 is positioned within the central bore extending through the body portion 362b of the actuator base 362 and may be coupled thereto by a press-fit, interference fit, or splined connection. The forward member 372 is positioned against a bearing member (not labeled) coupled to the output shaft 306 to prevent forward axial movement of thereof. The rearward member 374 is configured to be rotated by the drive gear assembly 390 relative to the forward member 372, as discussed in further detail below, and is positioned to press the apply plate 352c via an intermediate bearing (not labeled). The intermediate bearing allows the apply plate 352c to spin with the output shaft 306 independent of the rearward member 374, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace rearward axially to engage the apply plate 352c of the plate clutch 352 and, thereby, operate the secondary torque transfer mechanism 351. As discussed below, the drive gear assembly 390 is configured to not engage the followers 374a during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374 and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers 374a configured as rollers extending radially outward from a periphery of the rearward member 374. For example, the rearward member 374 may include two followers 374a that are positioned substantially opposite each other (i.e., approximately 180 degrees apart). Each follower 374a is coupled to and rotates about an axle, which extends radially from the periphery of the rearward member 374 (e.g., perpendicular to an outer surface thereof). The rearward member 374 may additionally include a boss or protrusion for each follower 374a extending radially outward from the periphery of the rearward member 374 to which the axle and follower 374a are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), a hub 394, and a gear plate 396 (e.g., a second plate), which are fixedly coupled to each other to be rotated in unison by the motor 364. When the motor 364 drives the gear plate 396 by way of the reduction gears 366, the hub 394 engages the followers 374a to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362b of the actuator base 362. The drive gear assembly 390 is held axially on the actuator base 362 between one of the thrust washers 367 and an end plate coupled to the body portion 362b of the base 362. While the drive gear assembly 390 may alternatively be provided as a single component or two primary components, an assembly of the sense plate 392, hub 394, and gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396a and an outer periphery 396b. The primary output shaft 306, along with other components of the actuator 361, extends through the central aperture. The outer periphery 396b includes a plurality of teeth that mesh with mating teeth of the reduction gears 366, so as to be rotated by the motor 364. Because the actuator 361 operates within a limited range of rotational motion in the first and second movement stages (e.g., +/−60 degrees), as described above for operating both the secondary torque transfer actuator mechanism 370 and the gear reduction actuator mechanism 380, only a portion of the outer periphery 396b (e.g., 180 degrees) may include teeth. The gear plate 396 may, for example, be made from powdered metal steel and, as discussed in further detail below, may include various features to facilitate coupling to the sense plate 392 and/or hub 394.

The sense plate 392 is configured to be driven by the gear plate 396 for operating the gear reduction actuator mechanism 380. The sense plate 392 may also be configured with a position sensor 369 for monitoring the rotational position of the actuator 361. The sense plate 392 is a unitary member, which generally includes a planar portion 392a with a central bore or aperture defined by an inner periphery 392b, and also includes first and second annular flanges 392c, 392d, which extend forward axially from an outer periphery of the planar portion 392a. In the drive gear assembly 390, the planar portion 392a is positioned forward of and adjacent to a forward surface of the gear plate 396. The first flange 392c extends substantially circumferentially (e.g., approximately 270 degrees) about the outer periphery of the planar portion 392a. The second flange 392d is configured relative to the outer radial member 384b of the barrel 384 to transfer torque therebetween via the torsion spring 386. More particularly, the second flange 392d is positioned between the circumferential ends of the first flange 392c and has a width that is complementary to the width of the outer radial member 384b of the barrel 384, such that both the outer radial member 384b of the barrel cam 384 and the second flange 392d of the sense plate 392 are positioned between and engaged by the ends 386a of the torsion spring 386. The second flange 392d is additionally, positioned radially between the coil of the torsion spring 386 and the outer radial member 384b of the barrel cam 384. The sense plate 392 may, for example, be made from powdered metal steel, aluminum, polymers or composites, etc. and, as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370.

The hub 394 is a unitary member, which generally includes a base portion 394a (e.g., radial flange) with a central aperture and includes an annular body 394b that extends axially from an inner periphery of the base portion 394 and that rotates about and bears against the body portion 362b of the actuator base 362. As part of the drive gear assembly 390, the annular body 394b extends rearward through the central apertures of the sense plate 392 and gear plate 396 with the sense plate 392 being held between the base portion 394a of the hub 394 and the gear plate 396. The hub 394 may, for example, be made from powdered metal steel, aluminum, polymers or composites, etc. and, as discussed in further detail below, may include various features to facilitate coupling to the sense plate 392 and/or gear plate 396.

The hub 394 additionally defines slots or cutouts 394c in the annular body 394b in which the followers 374a of the secondary torque transfer actuator mechanism 370 are positioned. Each slot 394c is defined between two circumferentially opposed end walls or tracks 394d of the annular body 394b, which extend axially rearward. The slots 394c are sized equally and are circumferentially spaced according to spacing of the followers 374a to provide simultaneous engagement of the followers 374a during rotation of the drive gear assembly 390. During the first movement stage, the followers 374a each remain in a middle region of the slot 394c between the opposed end walls 394d. With continued rotation in the second movement stage, each of two end walls 394d, one from each slot 394c, simultaneously engage and apply a tangential force to one of the followers 374a to rotate the rearward member 374 of the secondary torque transfer actuator mechanism 370. With this rotation, the rearward member 374 displaces axially rearward from the forward member 372, while the followers 374a roll rearward along the opposed end walls 394d. The end walls 394d have an axial length allowing the followers 374a to travel thereon through the full range of axial displacement of the secondary torque transfer actuator mechanism 370.

As referenced above, the drive gear assembly 390 includes the sense plate 392, hub 394, and gear plate 396, which are fixedly coupled together to rotate in unison as a single unit. According to the embodiment shown in FIGS. 3-5, the sense plate 392, hub 394, and gear plate 396 are coupled together via a press-fit, splined arrangement. More particularly, the annular body 394b (e.g., inner peripheral flange) of the hub 394 is configured to be inserted into the central bore of the sense plate 392 and the central bore of the gear plate 396. The diameter of the outer surface of the annular body 394*b* of the hub 394 nominally has an outer diameter that is slightly smaller than the inner diameters of the inner peripheries 392*b* and 396*a* of the sense plate 392 and gear plate 396, respectively. The annular body 394*b* includes a plurality of coupling splines 394*j* extending axially and protruding radially outwardly from the outer surface in one or more regions to tightly engage and couple to the inner peripheries 392*b* and 396*a* of the sense plate 392 and gear plate 396. The coupling splines 394*j* may, for example, be configured to deform or cut material forming the inner peripheries 392*b* and 396*a* as the sense plate 392 and gear plate 396 are pressed successively onto the annular body 394*b* of the hub 394. The annular body 394*b* may additionally include one or more alignment splines 394*k* extending axially and protruding radially outwardly from the outer surface at one or more locations to be received within alignment slots 392*f* and 396*c* of the sense plate 392 and gear plate 396, respectively. During operation, the motor 364 by way of the reduction gears 366 engages and rotates the gear plate 396, which transfers torque to the hub 394 by way of the splined connection, which in turn transfers torque to the sense plate 392 by way of the splined connection.

Figure 6:
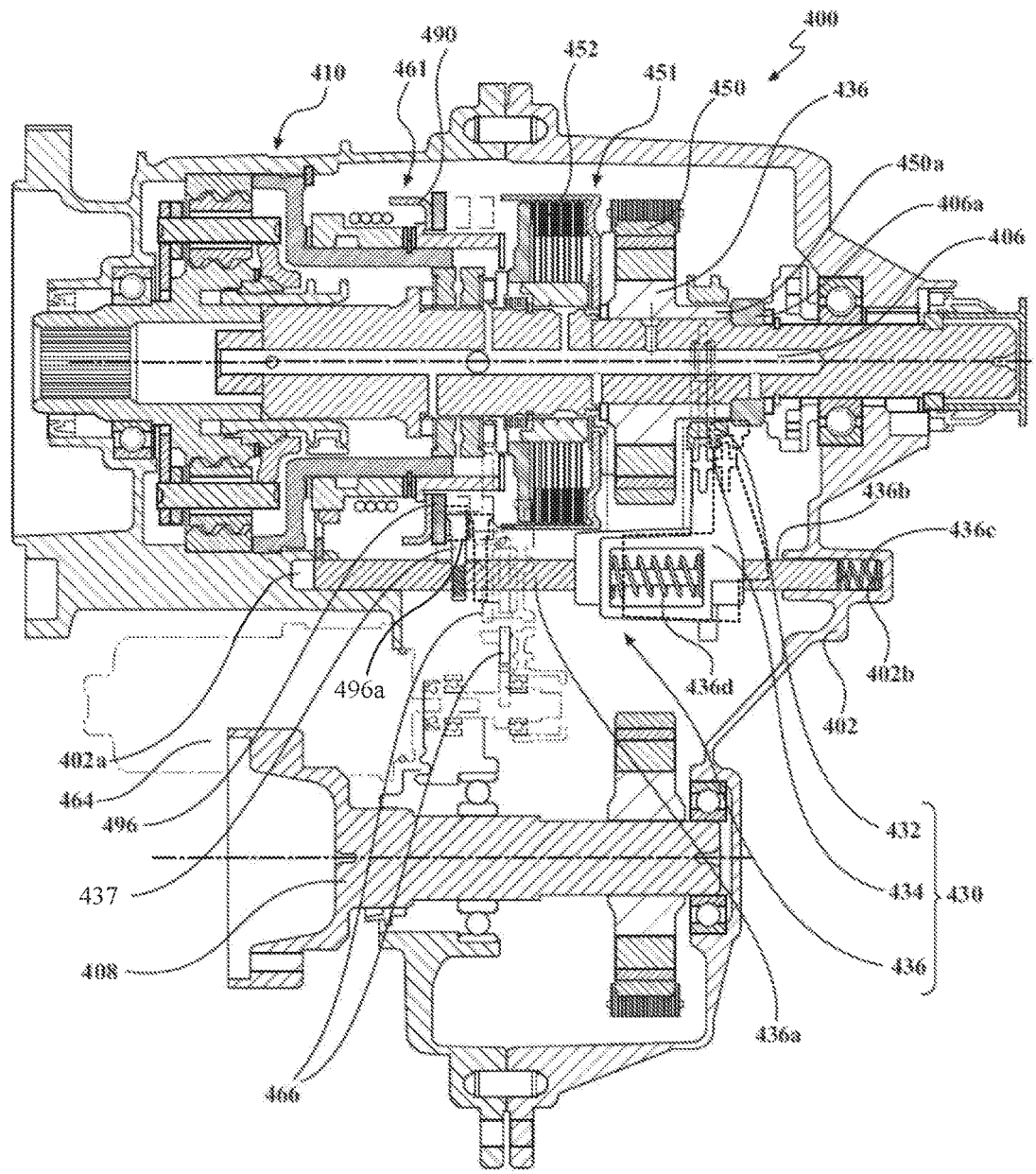
FIG. 6 is a cross-sectional view of a transfer case according to an exemplary embodiment.

According to the exemplary embodiment shown in FIGS. 6A and 6B, a transfer case 400 is configured substantially similar to the transfer case 300. More particularly, the transfer case 400 includes a housing 402, a gear reduction mechanism 410 and secondary torque transfer mechanism 451, which are operated in first and second stages (e.g., rotation) of an actuation system 461, as described for the transfer case 300. The secondary torque transfer mechanism 451, however, additionally includes a secondary torque locking mechanism 430, which is operated by continued rotation of the actuation system 461 in a third stage of movement. According to other exemplary embodiments, the secondary torque locking mechanism 430 may be operated by a separate actuation system and/or be used in another transfer case, such as the transfer case 200 (i.e., with a different actuation system) or the transfer case 400 without the gear reduction system 410.

The secondary torque locking mechanism 430 is configured to positively lock the transfer case into four-wheel drive operation (i.e., such that the secondary output shaft 408 is positively coupled to the primary output shaft 406). The secondary torque locking mechanism functions as a four-wheel drive locking mechanism. The secondary torque locking mechanism 430 generally includes a locking sleeve 432 (e.g., ring, collar, or hub), a fork 434 (e.g., shift fork, fork member), and a shaft assembly 436 (e.g., slide shaft, shift shaft, slide pin, slide assembly). The locking sleeve 432 functions as a secondary or alternative means to the plate clutch 452 for transferring torque from the primary output shaft 406 to the sprocket 450 and ultimately to the secondary output shaft 408, for example, in circumstances where the plate clutch 452 might otherwise slip or in which the actuation system 461 is unable to operate the plate clutch 452 (e.g., in an electrical failure). The locking sleeve 432 positively couples (i.e., locks) the first sprocket 450 into rotational engagement with the primary output shaft 406. The fork 434 and the shaft 436 move the locking sleeve 432 between positions in which the locking sleeve 432 does and does not positively couple the first sprocket 450 to the primary output shaft 406.

The locking sleeve 432 is configured as a dog clutch having inner splines (not shown), which engage external splines (not shown) of a rearwardly extending annular member 450*a* of the first sprocket 450. The inner splines of the locking sleeve 432 are also configured to engage external splines (not shown) of an outer splined collar 406*a* (e.g., hub, ring, etc.) fixedly coupled to the primary output shaft 406 to rotate therewith. In a first position, the locking sleeve 432 is biased axially forward in which case the inner splines do not engage the splined collar 406*a*, such that the output shaft 406 is not positively coupled to the first sprocket 450. In the first position, the primary output shaft 406 may rotate independent of the first sprocket 450 or may still transfer torque to the first sprocket 450 via the plate clutch 452. In a second position (shown in phantom (i.e., dashed lines) in FIG. 6), the locking sleeve 432 is biased axially rearward, such that the outer splines of the collar 406*a* are received in and mesh with the inner splines of the locking sleeve 432, while the outer splines of the annular member 450*a* are maintained in engagement with the inner splines of the locking sleeve 432, so as to positively couple the first sprocket 450 to the primary output shaft 406.

The fork 434 and shaft 436 are cooperatively configured to move the locking sleeve 432 axially between the first and second positions. The shaft 436 comprises one or more elongated members, which are configured to slide within forward and rearward recesses 402*a*, 402*b* of the transfer case 400. A first end of the fork 434 is coupled to the shaft assembly 436 and a second end of the fork 434 engages the locking sleeve 432 (e.g., by having a flange positioned within a peripheral channel of the locking sleeve 432). Thus, as the shaft assembly 436 moves axially in the recesses 402*a*, 402*b* of the transfer case housing 402, the fork 434 moves the locking sleeve 432 axially between the first and second positions to transfer torque from the primary output shaft 406 to the secondary output shaft 408. The transfer case 400 may additionally include a position sensor 438 configured to measure or detect a position of the rearward end of the shaft 436 within the rear recess 402*b* of the housing 402, so as to determine and indicate whether the sprocket 450 is locked to the primary output shaft 406.

To move the shaft 436, and thereby the locking sleeve 432, a spring 436*d* positioned in the rearward recess 402*b* of the housing normally biases the shaft assembly 436 axially forward and, thereby, the locking sleeve 432 forward into the first position. To move the shaft 436 axially rearward (i.e., in an opposite axial direction), the shaft 436 includes a follower arm 437 that functions as a follower of the rear surface of the gear plate 496 of the drive gear assembly 490 (i.e., part of the actuation system 461; refer to drive gear assembly 390 above for further description). The rear surface of the gear plate 496 functions as a face cam that includes a central dwell or flat region engaged by follower arm 437 during substantially entirely the first and second movement stages of the gear plate assembly 490 (e.g., initial rotation from center and continued rotation from respective ends of the first stage). The central dwell region is surrounded by advance movement regions of the face cam having one or more helically ramped surfaces 496*a* (shown in phantom in FIG. 6) that cause (e.g., move) the follower arm 437 to advance by displacing axially rearward during continued rotation in a third movement stage (e.g., continued rotation of the gear plate assembly 390 an additional 10-40 degrees from respective ends of the second positive stage and the second negative stage, or continued rotation of the motor 464). Thus, during this third movement stage of the drive gear assembly 490, which occurs after the second movement stage during which the secondary torque transfer system 451 is engaged via the plate clutch 452, the actuator system 461 moves the locking sleeve 432 to the second, rearward position to lock (e.g., couple or positively couple) the sprocket 450 to the output shaft 406.

While the different stages of rotation are discussed as being discrete, exclusive, and/or providing serial operation of the gear reduction actuator mechanism (refer to discussion of the actuator mechanism 380 above), the secondary torque transfer actuator mechanism (refer to discussion of the actuator mechanism 370 above), and the secondary torque locking mechanism and with specific ranges (i.e., corresponding to movement of the drive gear assembly), the different stages may instead provide overlapping operation, gaps between operation, and/or have different operational ranges (e.g., greater or lesser individually and/or in total). The different stages of rotation may also be considered to apply to the motor 464, for example, by virtue of the motor 464 rotating the drive gear assembly (e.g., the various gear reduction mechanism 410, the secondary torque transfer mechanism 451, and/or the locking mechanism 430 are operated in different, such as exclusive, stages of rotation of the motor 464).

In this third movement stage, the cam mechanisms of the reduction gear actuator mechanism (refer to discussion of the actuator mechanism 380 above) and the secondary torque transfer actuator mechanism (refer to discussion of the actuator mechanism 370 above) may include dwell or flat regions during which the third stage of rotation does not cause continued movement thereof. Instead or additionally, the secondary torque transfer actuator mechanism may include a retreat movement region coinciding or preceding the advancing of the follower arm 437, so as to slightly decompress the plate clutch 452 to allow relative rotation for aligning the slots between splines of annular member 450a of the first sprocket 450 and the splined collar 406a of the primary output shaft 406. According to another exemplary embodiment, the torque locking mechanism 430 may be configured to lock the first sprocket 450 to the primary output shaft 406 only in the high or low range in which case the rear surface of the gear plate 496 includes only one helically ramped surface (e.g., +the additional 30 degrees). According to still other exemplary embodiments, the follower arm 437 may instead be configured to engage one of the reduction gears (refer to gear 366 in FIG. 4) of the actuation system 461, which would instead have a ramped surface in the movement region.

According to another exemplary embodiment, the transfer case 400 may be configured to operate the plate clutch 452 and the locking mechanism 430 individually, such that the plate clutch 452 and the locking mechanism 430 do not operate serially to simultaneously couple, or transfer torque between, the primary output shaft 406 and the secondary output shaft 408. The actuation system 461 may rotate in opposite directions to operate the plate clutch 452 or the locking mechanism 430.

For example, the transfer case 400 may be configured to utilize the plate clutch 452 only in the high range, while utilizing the locking mechanism 430 only in the low range. The actuation system 461 is configured, such that continued rotation of the gear plate assembly 490 after the first stage in one direction (e.g., continued positive rotation of 10-40 degrees from the end of the first positive stage, or a second positive stage) causes the secondary torque transfer actuation mechanism (refer to actuation mechanism 370 above) to press the apply plate (refer to apply plate 352c above) of the plate clutch 452. During the second positive stage, the actuation system 461 is configured to not operate the locking mechanism 430, for example, by having a dwell region of the gear plate 496 associated with the second positive stage. Continued rotation after the first stage in the opposite direction (e.g., continued negative rotation of 10-40 degrees from the end of the first negative stage, or a second negative stage, also referred to as a third stage) causes the locking mechanism 430 (e.g., having a single ramp 496a) to move the locking ring 432 into the second position to engage both the sprocket 450 and the collar 406a of the primary output shaft 406. During the second negative stage, the actuation system is configured to not operate the plate clutch 452, for example, by having a dwell region associated with the members (refer to members 372, 374 above) or larger slot (refer to slot 394c above) of the hub (refer to hub 394 above) associated with the second negative stage. Additionally, because locking mechanism 430 provides binary coupling between the sprocket 450 and the primary output shaft 406, the transfer case 400 and, in particular, the actuation system 461 is configured to not actively engage the locking mechanism 430 (i.e., by rotating the gear plate assembly 490) during motion of the vehicle. However, because the plate clutch 452 provides gradual or slip coupling, the transfer case 400 and the actuation system 461 may be configured to actively engage the plate clutch 452 during motion of the vehicle.

While the shaft assembly 436 may be a single rigid member, the shaft assembly 436 may instead include a forward shaft member 436a, a rearward shaft member 436b coupled to the shift fork 434, and a spring 436c positioned therebetween, which enable the shaft assembly 436 to compress axially in the occurrence of a blocked shift event (i.e., when ends of the splines of the locking sleeve 432 engage ends of the splines of the splined collar 406a of the primary output shaft 406, rather than slide into slots between the splines of the collar 406a). Once the sprocket 450 rotates relative to the primary output shaft 406 to bring the slots between the splines into alignment (e.g., with intended or unintended minor slippage of the plate clutch 452 if utilized), the spring 436c, which is in a compressed state, then forces the rearward shaft member 436b to insert the teeth of the locking sleeve 432 into the slots between the splines of the splined collar 406a.

While the locking ring 432 has been described as being normally biased by the spring 436d to the first position to surround the annular member 450a of the sprocket 450 but not the collar 406a, according to another exemplary embodiment, the locking ring 432 may instead be configured to be normally biased (e.g., with the spring 436d instead being in the recess 402a) into a position surrounding the collar 406a but not the annular member 450a. In this scenario, the first sprocket 450 would not be positively coupled to the primary output shaft 406 when the locking ring 432 is in a normally biased first or rearward position, while the locking ring 432 would need to be biased forward to a second or forward position to lock the first sprocket 450 to the primary output shaft 406. The follower arm 437 would instead be configured to engage a forward facing ramped surface (e.g., of a reduction gear of the actuation system 461) to move the locking ring 432 forward into the second position during the third stage of rotation).

While the disclosure has been made in connection with what is presently considered to be the most practical and preferred embodiment, it should be understood that the disclosure is intended to cover various modifications and equivalent arrangements.

The invention claimed is:
1. A transfer case comprising:
a primary output shaft and a secondary output shaft;
a secondary torque transfer mechanism having a plate clutch and a locking ring, which are each configured to transfer torque from the primary output shaft to the secondary output shaft; and an actuation system rotates to operate the plate clutch to transfer torque from the primary output shaft to the secondary output shaft, and rotates to move the locking ring to transfer torque from the primary output shaft to the secondary output shaft, wherein the actuation system rotates in a first direction to operate the plate clutch and in a second direction to move the locking ring, the second direction being opposite the first direction.

2. The transfer case according to claim 1, further comprising a locking mechanism that includes the locking ring and a slide assembly that moves the locking ring, wherein the actuation system includes a drive assembly having a face cam that moves the slide assembly in a first axial direction, and a spring biases the slide assembly in a second axial direction that is opposite the first direction.

3. The transfer case according to claim 2, wherein the locking mechanism includes a shift fork coupled to the slide assembly and engaging the locking ring, and a follower arm coupled to the slide assembly and engaging the face cam.

4. The transfer case according to any of claim 2, wherein the slide assembly includes a first shaft member, a second shaft member, and a spring therebetween that allows the first shaft member and the second shaft member to move axially toward each other.

5. The transfer case according to claim 4, wherein the first shaft member slides within a forward recess of a housing of the transfer case, and the second shaft member slides within a rearward recess of the housing.

6. The transfer case according to claim 5, wherein another spring is arranged in the rearward recess to bias the slide assembly and the locking ring forward.

7. The transfer case according to claim 2, wherein the actuation system includes another face cam that is rotated by the drive assembly to operate the plate clutch.

8. The transfer case according to claim 1, further comprising:
a gear reduction mechanism that is configured to transfer torque from the primary output shaft to the secondary output shaft in a first drive ratio and a second drive ratio,
wherein the actuation system rotates to change the gear reduction mechanism between the first drive ratio and the second drive ratio.

9. The transfer case according to claim 8, wherein the actuation system rotates in a first stage of rotation in a first direction to select the first drive ratio and in a second direction to select the second drive ratio, rotates in a second stage after the first stage in the first direction to operate the plate clutch, and rotates in a third stage after the first stage in the second direction to move the locking ring, the second direction being opposite the first direction.

10. The transfer case according to claim 1, wherein the secondary torque transfer mechanism includes a sprocket, and the locking ring selectively couples the sprocket to the primary output shaft.

11. The transfer case according to claim 10, wherein the sprocket includes an annular member, the primary output shaft includes a collar, and the locking ring moves between a first position in which the locking ring engages the annular member but not the collar and a second position in which the locking ring engages both the annular member and the collar.

12. A transfer case comprising:
an input shaft, a primary output shaft, and a secondary output shaft;
a gear reduction mechanism configured to transfer torque from the primary output shaft to the secondary output shaft in a first drive ratio and a second drive ratio;
a secondary torque transfer mechanism having a plate clutch and a locking ring, which are each configured to transfer torque from the primary output shaft to the secondary output shaft; and
an actuator system having a drive assembly, the actuator system being configured to cause the gear reduction mechanism to change between the first drive ratio and the second drive ratio by rotating the drive assembly in a first stage of rotation, cause the plate clutch to transfer torque from the primary output shaft to the secondary output shaft by rotating the drive assembly in a second stage of rotation in a first direction after a first end of the first stage of rotation, and cause the locking ring to transfer torque from the primary output shaft to the secondary output shaft by rotating the drive assembly in a third stage of rotation in a second direction, opposite the first direction, after a second end of the first stage of rotation.

13. The transfer case according to claim 12, further comprising a locking mechanism that includes a slide shaft operationally coupled to a cam follower and the locking ring, wherein the cam follower engages a movement advance region of the drive assembly during the third stage of rotation to move the slide shaft to move the locking ring to transfer torque between the primary output shaft and the secondary output shaft.

14. A transfer case comprising:
a primary output shaft;
a secondary output shaft;
a sprocket rotatably coupled to the secondary output shaft;
a secondary torque transfer mechanism having a plate clutch that selectively couples the sprocket to the primary output shaft to transfer torque from the primary output shaft to the secondary output shaft; and
a locking mechanism that selectively couples the sprocket to the primary output shaft to transfer torque from the primary output shaft to the secondary output shaft, the locking mechanism having a locking sleeve that in a first position is engaged with an annular member of the sprocket but not a collar and in a second position is engaged with both the annular member and the collar.

15. The transfer case according to claim 14, wherein the secondary torque transfer mechanism and the locking mechanism are operable with a motor.

16. The transfer case according to claim 15, wherein the motor operates the secondary torque transfer mechanism and the locking mechanism in exclusive ranges of motion of the motor.

17. The transfer case according to claim 15, wherein the motor rotates a face cam to operate the secondary torque transfer mechanism and rotates another face cam to operate the locking mechanism.

18. The transfer case according to claim 17, further comprising a gear reduction mechanism that is operated by a barrel cam rotated by the motor.

19. The transfer case according to claim 18, wherein the motor operates the secondary torque transfer mechanism, the locking mechanism, and the gear reduction mechanism in exclusive ranges of motion of the motor.

* * * * *